United States Patent [19]

Ball et al.

[11] Patent Number: 4,611,150
[45] Date of Patent: Sep. 9, 1986

[54] LOAD RESPONSIVE INVERTER FOR ELECTROLUMINESCENT LAMP

[75] Inventors: Ervin M. Ball, Zionsville; Jack E. Hutson, Indianapolis, both of Ind.

[73] Assignee: Microlite, Inc., Westfield, Ind.

[21] Appl. No.: 641,309

[22] Filed: Aug. 16, 1984

[51] Int. Cl.⁴ .............................................. H05B 37/02
[52] U.S. Cl. .................. 315/307; 315/169.3; 331/112; 363/97; 363/131
[58] Field of Search ...................... 363/18, 19, 97, 131; 320/1; 331/112; 315/169.3, 307, 219, 158; 340/781; 250/205

[56] References Cited

U.S. PATENT DOCUMENTS

| | | |
|---|---|---|
| 2,804,547 | 8/1957 | Mortimer .............................. 363/131 |
| 2,849,615 | 8/1958 | Gustafson ............................ 363/131 |
| 3,219,906 | 11/1965 | Keller et al. .......................... 363/96 |
| 3,242,415 | 3/1966 | King et al. . | |
| 3,749,977 | 7/1973 | Sliker .................................... 340/781 |
| 4,006,485 | 2/1977 | Yamanishi et al. .................. 250/205 |
| 4,084,219 | 4/1978 | Furukawa et al. .................... 363/97 |
| 4,254,362 | 3/1981 | Tulleners ........................... 315/169.3 |
| 4,443,741 | 4/1984 | Tanaka et al. ....................... 315/307 |
| 4,449,075 | 5/1984 | D'Onofrio et al. ............... 315/169.3 |
| 4,536,680 | 8/1985 | Roberts ................................ 315/49 |

FOREIGN PATENT DOCUMENTS 1243531 8/1971 United Kingdom .

Primary Examiner—William H. Beha, Jr.
Attorney, Agent, or Firm—Barnes & Thornburg

[57] ABSTRACT

An inverter for providing power to an electroluminescent lamp which optimizes the light output over the life of the lamp, includes an oscillator and a voltage feedback for sensing the voltage across the electroluminescent lamp, the oscillator being responsive to the feedback voltage to generate a time varying signal at a frequency related to the sensed feedback voltage.

8 Claims, 1 Drawing Figure

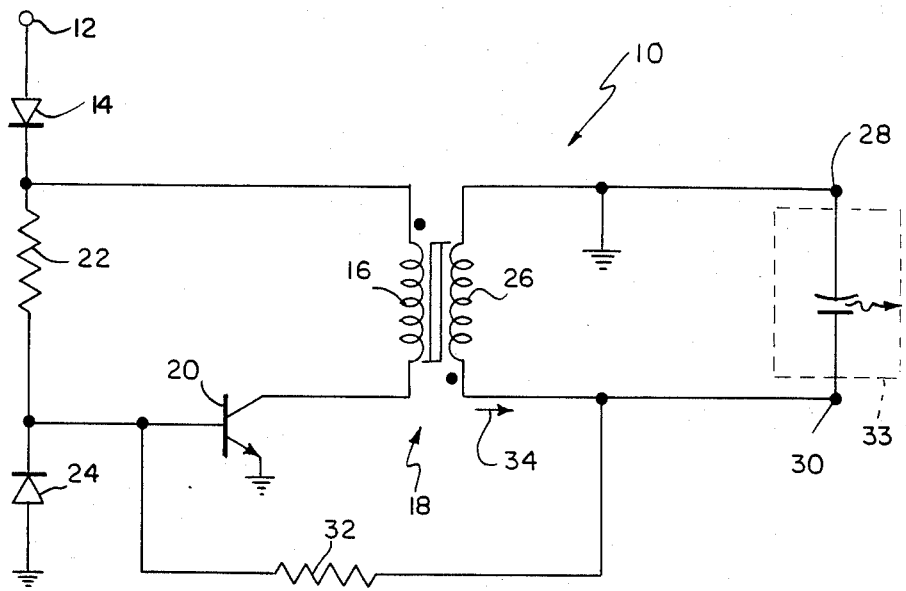

LOAD RESPONSIVE INVERTER FOR ELECTROLUMINESCENT LAMP

This invention relates to inverters, and more particularly to inverters for supplying power to excite an electroluminescent lamp.

Inverters, as the term is used in this application, are devices which convert direct current (DC) to alternating current (AC). A commonly known and used inverter is a tickler-coil inverter. This inverter essentially comprises a transformer having a primary and a secondary winding. The primary winding is coupled through a switching means to a source of DC power. The AC power, or oscillating signal, is developed in the secondary winding of the transformer and can be coupled to a load which can be any device needing AC for excitation. The oscillating signal is developed in the secondary by the switching means switching power to the primary on and off. The tickler-coil inverter utilizes a third coil which senses the flux in the transformer and develops a voltage which is fed back to the switching means to cause the switching means to oscillate. As can be recognized, a tickler-coil inverter must utilize a transformer which costs significantly more than a transformer that only has a primary and a secondary winding and does not have the third coil or tickler-coil.

Electroluminescent devices are devices which utilize a luminescent material, such as phosphorus to emit light when excited with an appropriate power source. Illustrative of these types of devices is a MD955 Electraluminescent Lamp manufactured by Ball Engineering, 800 E. Main St., Westfield, Ind. 46074. Typically, the power source needed to excite such devices is an AC or oscillating signal having a nominal voltage of approximately 150 volts peak-to-peak.

The brightness of the light emitted by a electroluminescent lamp has been found to be a function of the voltage exciting the device and the frequency at which the excitation voltage is oscillating. Applicants have determined that there is an optimum voltage-to-frequency ratio for exciting a given type of those lamps to obtain optimum performance and life. This ratio can be determined experimentally for each type of lamp and is thought to be a function of the area of luminescent material in the lamp.

The impedance of an electroluminescent lamp is primarily capacitive in nature. Electroluminescent lamps have typically exhibited a capacitive decay over a period of time. Generally, the most significant decay occurs within the first twenty four hours of excitation wherein a 20% decrease of capacitance has been observed. The change in capacitance as a function of time slows considerably thereafter so that there is only a further 20% decrease after typically about 1,500 hours of excitation.

Inverters which have been used to excite electroluminescent lamps have exhibited the characteristics of current sources. The current induced in the secondary winding of the inverter's transformer has tended to remain relatively constant for a given frequency even though the impedance of the device being excited is changed. Therefore, the voltage across the lamp will increase as the capacitance decreases.

It is a well known fact that in a tranformer circuit, inductance in the primary will be reflected as capacitance in the secondary and vice-versa. In a tickler coil type inverter, the inductance due to the tickler coil will be reflected in the secondary of the transformer as a capacitance. Applicants have determined that the value of the reflected capacitance due to the tickler coil's inductance is the same order of magnitude as the capacitance of the electroluminescent lamp. Further, this reflected or phantom capacitance will be in parallel with the lamp. Therefore, any changes in the capacitance of the lamp will have only a proportional effect upon the total capacitance load on the secondary due to the parallel circuit. Consequently, changes in the lamp's capacitance cannot be adequately compensated for as they cannot be accurately detected in a tickler coil inverter. Therefore, the light output of a tickler coil excited electroluminescent device will diminish over time as its capacitance decays since the decrease in capacitance will not be adequately compensated for. Further, the voltage-to-frequency ratio will shift out of the optimum range decreasing the performance and life of the lamp.

It is an object of the instant invention to provide an inverter for exciting an electroluminescent lamp that compensates for changes in the capacitance of an electroluminescent lamp and maintains the voltage-to-frequency ratio exciting the lamp relatively constant.

It is further an object of the instant invention to provide a resistive feedback inverter to eliminate the reflected capacitance due to a tickler coil.

An inverter in accordance with the instant invention has an oscillating means having an input and an output. The input is coupled to a DC power source and the output is coupled to an electroluminescent lamp. The inverter further includes feedback means for sensing the voltage across the electroluminescent lamp, means for coupling the feedback means to the lamp, and means for coupling the feedback means to the oscillating means. The oscillating means is responsive to the voltage sensed by the feedback means and generates the time varying signal at its output at a frequency related to the sensed voltage.

Additional features and advantages of the invention will become apparent to those skilled in the art upon consideration of the following detailed description of a preferred embodiment exemplifying the best mode of carrying out the invention as presently perceived.

Referring the FIGURE, an inverter 10 constructed in accordance with the instant invention has a plus terminal 12 which is connected to a source of DC power (not shown). Illustratively, the DC voltage is 14 volts DC. Coupled to terminal 12 is the anode of diode 14. The cathode of diode 14 is coupled to the primary winding 16 of transformer 18 and to the base of transistor 20 through resistor 22. Also coupled to the base of transistor 20 is the cathode of diode 24. The anode of diode 24 is coupled to ground. The collector of transistor 20 is coupled to the other side of primary winding 16 of transformer 18, and the emitter of transistor 20 is coupled to ground. Illustratively, transistor 20 is a NPN transistor such as a MJE15030 manufactured by Motorola, Inc. Transformer 18 could illustratively be an iron core transformer having a proper turn ratio which is illustratively 1 to 10. Further, the transformer is selected such that its secondary will act primarily as a current source when loaded by the lamp which it will excite.

Transformer 18 has a secondary winding 26 having one side coupled to ground and to common output terminal 28. The other side of secondary winding 26 is coupled to output terminal 30 and through feedback resistor 32 to the base of transistor 20. An electroluminescent lamp 33 is coupled between output terminals 30, 28.

The operation of inverter 10 will now be described. When a source of DC power is first applied to terminal 12, current will begin to flow through resistor 22 into the base of transistor 20 and begin to bias transistor 20 toward saturation. As transistor 20 switches on, current will begin to flow through primary winding 16. Current flowing through primary winding 16 will induce a current flow in secondary winding 26 in a direction indicated by arrow 34. This will generate a positive voltage which is coupled back through feedback resistor 32 to the base of transistor 20 acting to drive transistor 20 further into saturation. Once transistor 20 reaches saturation, the collector-to-emitter junction will be a virtual short, thereby coupling one leg of primary winding 16 to ground.

Current will continue to flow through primary windings 16 and will continue to induce current flow in secondary winding 26 due to the magnetic coupling between the primary and secondary windings. When transformer 18 begins to reach saturation, the magnetic coupling between the primary winding 16 and the secondary winding 26 will begin to diminish as the rate of change in the magnetic flux induced by current flowing through the primary winding decreases. Therefore, the current induced in secondary winding 26 will begin to decrease, which in turn will tend to reduce the voltage coupled through feedback resistor 32 to the base of transistor 20. This decreases the base bias voltage for transistor 20, tending to raise the resistance between the collector and emitter of transistor 20. This in turn tends to reduce the current flow through primary winding 16. Once transformer 18 reaches saturation, there will no longer be any magnetic coupling between primary winding 16 and secondary winding 26 as the magnetic flux induced will no longer be changing, and therefore no current will be induced to flow in secondary winding 26. Therefore, there will be no voltage coupled through feedback resistor 32 to the base of transistor 20.

At the same time that this is occurring, the current flowing through primary winding 16 will be approaching a steady state condition. Since transistor 20 has coupled primary winding 16 to ground through the collector-emitter junction, the voltage at the leg of primary winding 16 coupled to the cathode of diode 14 will also have been pulled virtually to ground in that as the current flowing through primary winding 16 approaches steady-state conditions, primary winding 16 will tend to act as a DC short. Therefore, transistor 20 will be biased off, breaking the current flow through primary winding 16. This will cause the magnetic field in transformer 18 to collapse, inducing a current flow in the secondary circuit in a direction opposite to arrow 34. This will generate a negative voltage at terminal 30 which is coupled through feedback resistor 32 to the base of transistor 20, driving transistor 20 further into cut off.

Eventually, transformer 18 will reach a quiescent condition so that there is no longer a changing magnetic field through the transformer. Therefore, there will no longer be a current induced in the secondary winding 26 and the voltage at terminal 30 will return to zero. This will permit the base of transistor 20 to be pulled up by the voltage coupled to it through resistor 22 which will begin to bias transistor 20 toward saturation thereby beginning the oscillation sequence anew. Transistor 20 will oscillate from cut off to saturation at a rate primarily determined by the characteristics of transformer 18 and the impedance of electroluminescent lamp 33.

As has been discussed previously, the impedance characteristics of electroluminescent lamp 33 are primarily capacitive in nature. Further, the capacitance of electroluminescent lamp 33 tends to decrease over a period of time. The most significant capacitive decay occurs during the first twenty-four hours of excitation wherein as much as a 20% decrease in capacitance has been observed.

When the capacitance of a primarily capacitive load decreases, there will be a resulting increase in the impedance of the load. For an electroluminescent lamp 33 coupled to the secondary winding 26, the decrease in capacitance will cause a voltage increase across electroluminescent lamp 33 from terminals 30 to 28 as the secondary of the transformer is acting like a current source. The increase in voltage across electroluminescent lamp 33 will be coupled through feedback resistor 32 to the base of transistor 20 which will cause transistor 20 to switch at a faster rate as it will tend to drive transistor 20 into saturation quicker and, as the negative voltage induced by the collapsing field in transformer 18 will also be greater, the negative voltage coupled through feedback resistor 32 to the base of transistor 20 will tend to drive transistor 20 into cut-off faster. This will cause an increase in the frequency of oscillation of transistor 20. Therefore, the voltage-to-frequency ratio of the excitation voltage will be maintained substantially uniform thereby maintaining the optimum light level emitted by the electroluminescent lamp and insuring optimum performance and life of the lamp. The novel resistive feedback inverter of the instant invention acts to sense the impedance characteristics of electroluminescent lamp 33 and varies the frequency of the signal generated to excite electroluminescent lamp 33, thereby maintaining the light output of electroluminescent lamp 33 at a substantially uniform level.

Although the invention has been described in detail with reference to certain preferred embodiments and specific examples, variations and modifications exist within the scope and spirit of the invention as described and as defined in the following claims.

What is claimed is:

1. An inverter for providing power to an electroluminescent lamp, comprising
    oscillating means having an input and output, means for coupling the input to a source providing a substantially D.C. signal, means for coupling the output to the electroluminescent lamp, feedback means for sensing the voltage across the electroluminescent lamp, means for coupling the feedback means to the electroluminescent lamp, means for coupling the feedback means to the oscillating means, the oscillating means responsive to the feedback means for generating a time varying signal at its output at a frequency related to the voltage sensed by the feedback means.

2. The inverter of claim 1 wherein the feedback means comprises a resistor.

3. The inverter of claim 2 wherein the oscillating means comprises a transformer and an electronic switch, the transformer having a primary winding coupled to the electronic switch and a secondary winding coupled to the electroluminescent lamp, the means for coupling the oscillating means' input to the D.C. signal source comprising means for coupling the electronic switch to the D.C. signal source, and the means for coupling the feedback means to the oscillating means comprises means for coupling the resistor to the electronic switch.

4. The inverter of claim 3 wherein the resistor provides a feedback voltage to the electronic switch related to the voltage across the electroluminescent lamp, the electronic switch responding to the feedback voltage to oscillate from a non-conducting state to a conducting state and from the conducting state to the non-conducting state at a frequency related to the feedback voltage wherein the electronic switch permits current flow from the D.C. signal source through the primary winding when it is in the conductive state and blocks current flow from the D.C. signal source through the primary winding when it is in the non conductive state.

5. The inverter of claim 4 wherein the electroluminescent lamp has a substantially wholly capacitive impedence, the voltage across the lamp being related to the lamp's capacitance, and the electronic switch responding to changes in the feedback voltage caused by changes in the lamp's capacitance to vary its rate of oscillation thereby varying the oscillation rate of the time varying signal at the output of the oscillating means to compensate for the lamp's change in capacitance to maintain the lamp at a substantially uniform brightness.

6. An inverter for providing an oscillating power supply for an electroluminescent lamp, the lamp having a substantially wholly capacitive impedance, comprising A transformer having a primary and secondary winding, first coupling means for coupling the primary winding to a substantially direct current (D.C.) power source, second coupling means for coupling the secondary winding to the electroluminescent lamp, the first coupling means including switching means periodically changing from a conductive state to a non-conductive state and from the non-conductive state to the conductive state alternatively to permit current to flow from the D.C. power source through the primary winding and to block current from flowing from the D.C. power source through the primary winding, thereby generating an oscillating signal in the secondary winding, the frequency of which is related to the periodic switching rate of the switching means, voltage sensing means for sensing voltage across the electroluminescent lamp to sense the capacitive characteristics of the electroluminescent lamp, means for coupling the sensing means to the electronic switch to control the frequency of the oscillating signal wherein the frequency of the oscillating signal is adjusted to compensate for capacitance changes in the electroluminescent lamp to maintain the brightness of the electroluminescent lamp at a substantially uniform level.

7. The invention of claim 6 wherein the electronic switch responds to a change in the voltage across the lamp coupled to it by the sensing means, caused by a change in the lamp's capacitance, by changing its switching rate, thereby changing the oscillating frequency of the oscillating signal in the secondary winding to compensate for the lamp's change in capacitance and maintain the brightness of the lamp at a substantially uniform level.

8. An inverter for providing an oscillating signal to excite an electroluminescent lamp, the lamp having a substantially wholly capacitive impedance that can change over a period of time, thereby adversely affecting the intensity of light emitted by the lamp, the inverter being especially adapted to respond to any change in the lamp's capacitance to vary at least the frequency of the oscillating signal, thereby to compensate for the lamp's changed capacitance to maintain the intensity of light emitted by the lamp at a substantially uniform level, the inverter comprising a transformer having a primary winding and a secondary winding, means for coupling the primary winding to a source of substantially direct current, electronic switch means for controlling the flow of current through the primary winding, means for coupling the switch means to the primary winding, means for coupling the secondary winding to the lamp, feedback means for sensing a voltage across the lamp related to the lamp's impedance and feeding it back to the switch means, means for coupling the feedback means to the lamp, and means for coupling the feedback means to the switch means.

* * * * *